United States Patent [19]
Basora et al.

[11] Patent Number: 6,014,925
[45] Date of Patent: Jan. 18, 2000

[54] TOASTER AND PROCESS FOR MOUNTING ELECTROMAGNETIC ACTUATOR THEREIN

[75] Inventors: Sanjuan Antonio Basora; Julian Arnedo, both of Barcelona, Spain

[73] Assignee: Moulinex S.A., Paris, France

[21] Appl. No.: 09/065,033

[22] PCT Filed: Oct. 21, 1996

[86] PCT No.: PCT/FR96/01646

§ 371 Date: Apr. 27, 1998

§ 102(e) Date: Apr. 27, 1998

[87] PCT Pub. No.: WO97/15220

PCT Pub. Date: May 1, 1997

[30] Foreign Application Priority Data

Oct. 26, 1995 [FR] France .................................. 95 12666

[51] Int. Cl.⁷ .................................................. A47J 37/08
[52] U.S. Cl. .................. 99/327; 99/329 P; 99/329 RT; 99/385; 99/389; 99/391; 219/492; 219/521; 426/241; 426/466; 426/520; 426/523
[58] Field of Search ................. 99/326–333, 385–391, 99/393, 426, 486; 219/492, 493, 497, 521, 481, 489, 413, 518; 426/241, 466, 520, 523

[56] References Cited

U.S. PATENT DOCUMENTS

| | | | |
|---|---|---|---|
| 3,956,978 | 5/1976 | Borley | 99/329 R |
| 5,018,437 | 5/1991 | San Juan | 99/327 |
| 5,044,263 | 9/1991 | Birkert et al. | 99/327 |
| 5,304,782 | 4/1994 | McNair et al. | 219/497 X |
| 5,771,780 | 6/1998 | Basora et al. | 99/389 X |

FOREIGN PATENT DOCUMENTS

| | | |
|---|---|---|
| 2 235 566 | 1/1975 | France . |
| 30 20 778 | 12/1981 | Germany . |
| 37 31 959 | 8/1988 | Germany . |
| 44 39 776 | 9/1995 | Germany . |
| 2 264 824 | 9/1993 | United Kingdom . |

*Primary Examiner*—Timothy Simone
*Attorney, Agent, or Firm*—Young & Thompson

[57] ABSTRACT

A toaster comprises a housing (1) enclosing a toasting chamber (2) in which is movably mounted a bread carrier (4) between an ejection position and a toasting position in which it is retained by an electromagnetic actuating device (5) comprising a control winding (6) with a hollow support (7) which is secured to a plate (20) carrying electrical connection members (22), and which surrounds a magnetic core (8), as well as a movable armature (9) adapted to retain the bread carrier (4) in its toasting position. The magnetic core (8) is mechanically mounted independently of the support (7) of the winding (6) and of the plate (20), and is secured to a member (24) on the housing (1).

12 Claims, 2 Drawing Sheets

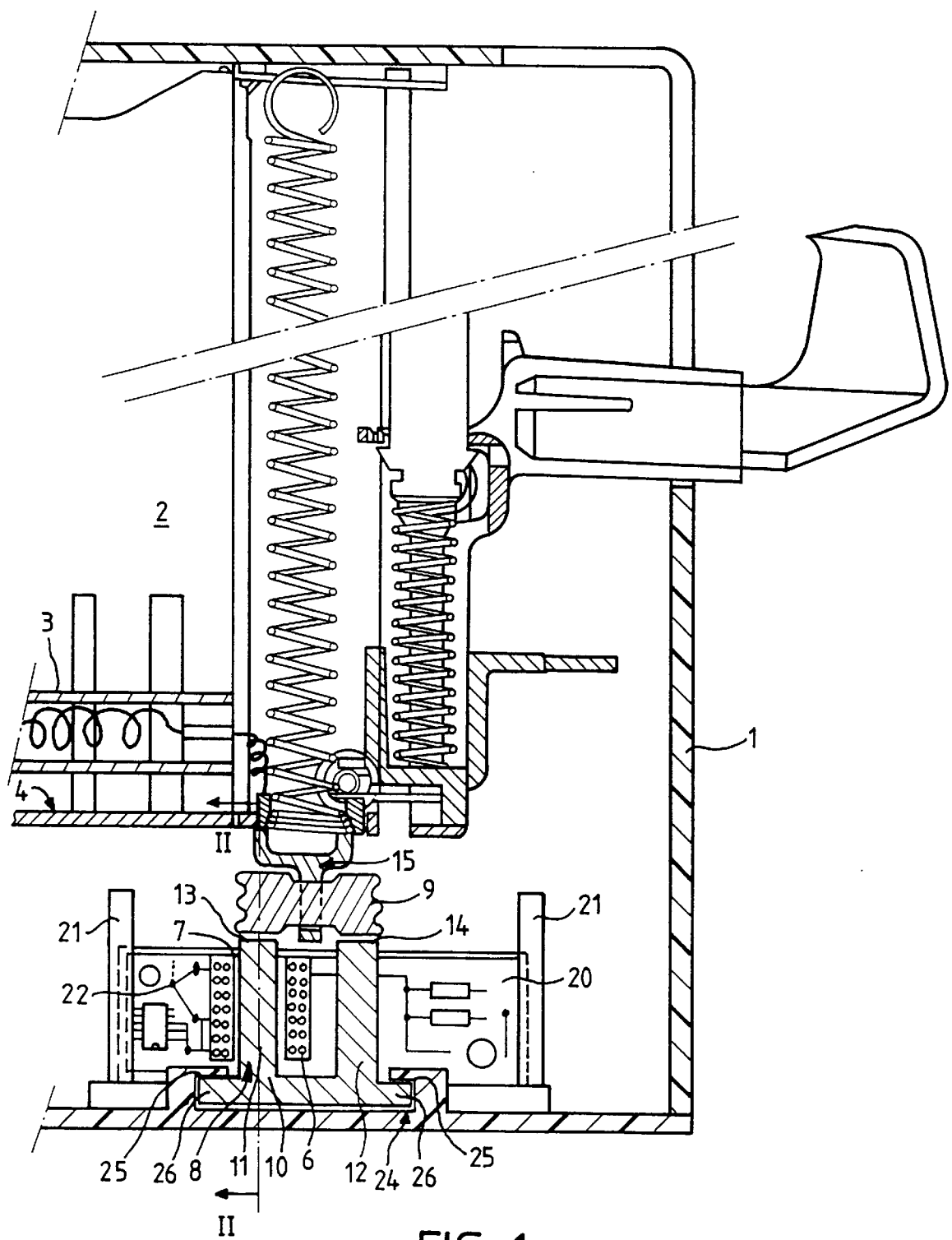
FIG_1

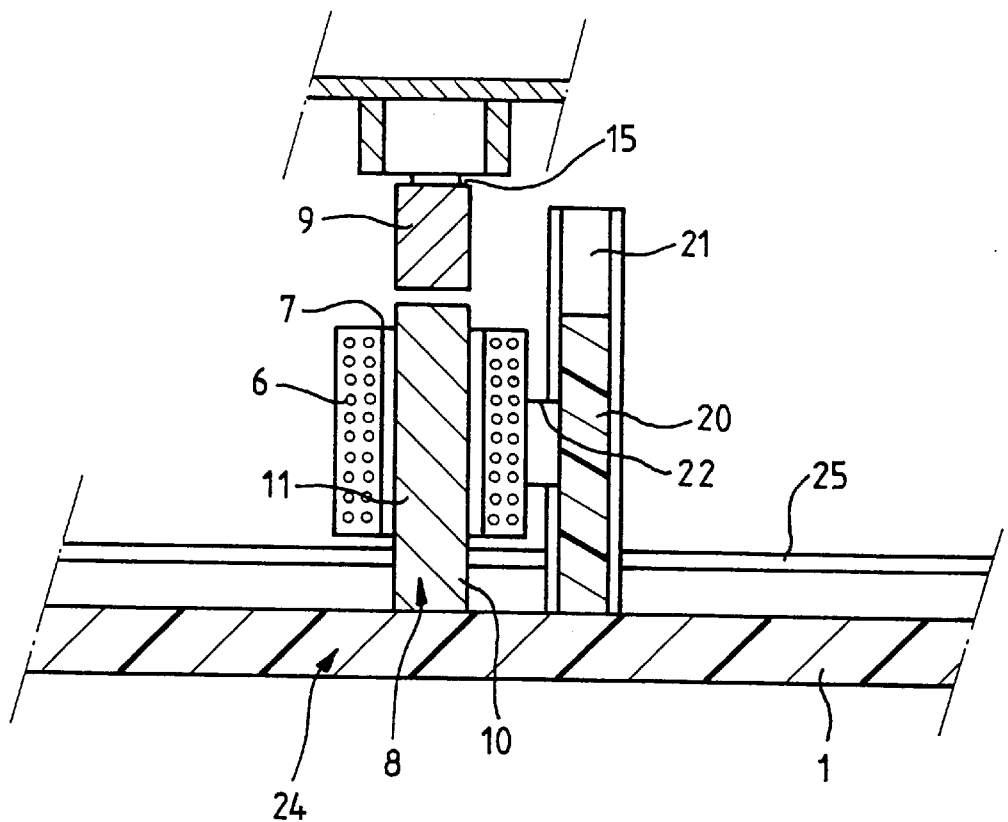
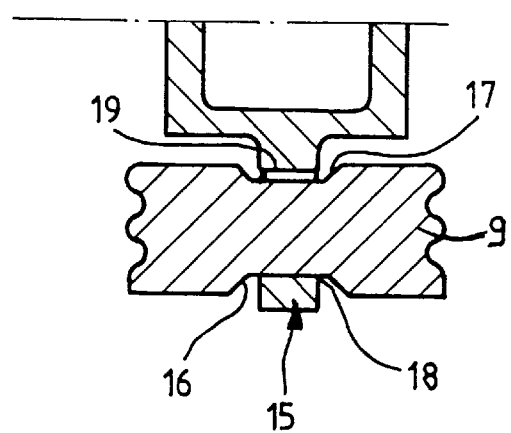

TOASTER AND PROCESS FOR MOUNTING ELECTROMAGNETIC ACTUATOR THEREIN

FIELD OF THE INVENTION

The invention relates to toasters comprising a housing enclosing a toasting chamber provided with at least one heating resistance and in which is movably mounted a bread carrier movable between at least one ejection position and a toasting position in which it is retained by an electromagnetic actuating device comprising a control winding with a hollow support which is secured to a plate mounted fixedly in the housing and carrying at least the electrical connection members and which surrounds a magnetic core, as well as a movable armature adapted to retain the bread carrier in its toasting position when the winding is fed.

BACKGROUND OF THE INVENTION

In toasters of this type, the electromagnetic actuating device is mounted on a plate comprising electrical connection members such as printed tracks as well as electrical and electronic components for controlling the supply of the heating resistance and the actuating winding. These tracks or printed circuits are generally obtained by photoengraving on a relatively thin insulating plate, and are therefore very sensitive to any mechanical stresses exerted on them particularly during implantation of the winding/core assembly of the actuator and of the direct action of the wires to the winding on said tracks. Moreover, during operation of the bread carrier, repeated shocks of the movable armature on the magnetic core and the force of traction of this movable armature exerted on the core against the magnetic force, act on the winding and the connections and separate the printed tracks from the supplemental constraints.

These different constraints give rise particularly to micro-cracks in the tracks which eventually lead to interruption of the electric circuits.

SUMMARY OF THE INVENTION

The invention has for its object to overcome the above drawbacks and thereby to provide a toaster whose actuating device does not give rise to any damage to the plate no matter what the constraints of manufacture, mounting and operation.

According to the invention, the magnetic core is mounted mechanically independent of the support of the winding and of the plate, and is secured to a portion of the housing.

Thus, it will be understood that the mechanical separation of the magnetic core from the support of the winding isolates this plate particularly from the moving pieces and therefore eliminates the transmission of stresses, exerted by the bread carrier on the core, to the plate, thereby avoiding its damage.

The invention also relates to a process for mounting such an electromagnetic actuating device in the housing of the toaster which is perfectly adapted to mass production.

BRIEF DESCRIPTION OF THE DRAWINGS

The characteristics and advantages of the invention will become apparent from the following description, given by way of non-limiting example, with reference to the accompanying drawings, in which:

FIG. 1 is a fragmentary vertical cross-sectional view of a toaster according to the invention and illustrating an electromagnetic actuating device;

FIG. 2 is a fragmentary vertical cross section on a larger scale on the line II—II of FIG. 1, of the actuating device;

FIG. 3 is an enlarged view of a detail of the actuating device of FIG. 1, showing the movable armature.

DETAILED DESCRIPTION OF THE INVENTION

FIG. 1 shows in fragmentary view a toaster comprising a housing 1 enclosing a toasting chamber 2 provided with at least one heating resistance 3 and in which is movably vertically mounted a bread carrier 4, between an ejection position (not shown) and a toasting position, shown in FIG. 1, in which it is retained by the electromagnetic actuating device 5. This actuating device comprises in known manner a control winding 6 with a hollow support 7 which surrounds a magnetic core 8, and a movable armature 9 adapted to retain the bread carrier 4 in its toasting position when the winding 6 is supplied and thereby to be pressed against the magnetic core. As illustrated, the magnetic core has a general U shape and comprises to this end a base 10 carrying two branches 11 and 12 whose free ends 13 and 14 are located in a same plane; one of said branches, 11, carries the control winding 6 and projects from the winding at its free end 13. As to the movable armature 9, it is constituted by a magnetic member of generally parallelepipedal shape and is suspended from a ring 15 secured to the bread carrier 4.

According to a preferred embodiment better shown in FIG. 3, the magnetic member of the movable armature 9 has in its central region two opposite depressions 16, 17 provided respectively in its two large lateral surfaces, and the ring 15 comprises on its internal surface two opposed regions 18, 19 of which one, 18, comes into contact with the depression 16 and serves as a pivot for the movable armature, whilst the other, 19, comes opposite the depression 17 and serves for centering this armature. Thus, the internal lateral surface is adapted to come into flat contact with the ends 13 and 14 of the core.

As known per se, the housing 1 encloses all the electrical and electronic controls for supplying the heating resistance 3 and the winding 6 of the electromagnetic actuating device 5. To this end, it comprises a plate 20 of the printed circuit type mounted fixedly in guides 21 of the housing 1 and bearing the electronic components, the connection members 22 as well as the winding 6 for controlling the actuator 5.

According to the invention, the magnetic hub 8 is mounted mechanically independent of the hollow support 7 for the winding 6 and of the plate 20, and is secured to a member 24 of the housing 1. As can be better seen in FIG. 2, the support 7 surrounds the branch 11 of the core with a slight play α, hardly disturbing the magnetization of the core 8.

Thus, thanks to this particular embodiment of the construction of the actuating device, all the mechanical stresses imposed on the core 8 by the movable armature 9 are directly transmitted to the member 24 of the housing 1 and no longer to the winding 6. As a result, the winding 6 being insulated from shocks, transmits no mechanical reaction or stress to the plate 20 and hence gives rise to no deterioration of the tracks or electrical connections or of the components attached thereto.

According to another important characteristic of the invention, the magnetic core 8 comprises a base 10 having means for assembly with the member 24 of the housing 1. As shown in FIG. 1, the assembly means comprise, on the one hand, on the member 24, two slideways 25 located facing each other, and, on the other hand, on the base 10 two opposite tongues 26 having respectively a shape complementary to that of the slides and engaged in said slides. Such an assembly of general T shape ensures both a good positioning and a good securement of the core, thereby preventing misalignment of the branch 11 from the axis of the core 6 and hence guaranteeing the play α between the support 7 and this branch 11. In a preferred embodiment, the housing 1 being of a plastic material, the member 24 and the slides 25 are molded directly with the housing and more exactly with the portion of the bottom of the housing. The assembly thus comprised, between the metallic base 10 of the core 8 and the slides 25 of plastic, ensures by itself a good coefficient of sliding between the pieces, ensuring the correct securement of the core relative to the winding 6.

In the embodiment shown in FIGS. 1 and 2, the winding 6 is mounted on the plate 20 such that its axis is parallel to the plane of said plate, and the plate is itself mounted in a plane parallel at least to the core 8 passing through the hollow support 7 of the winding, namely the branch 11. Preferably, the plate 20 extends parallel to the two branches 11 and 12 of the core 8, thereby permitting easy mounting of the winding 6 on the core 8 as will be explained later.

Thanks to this direct assembly of the base 10 of the core 8 in the slides 25, the movable armature 9 comes correctly into contact with the ends 13 and 14 of the core when the carrier 4 is in its toasting position, and the magnetic attractive force exerted by the core on this armature 9, against the ejection springs urging the carrier upwardly, transmits no mechanical stress to the winding 6 and thence to the plate 20.

There will now be explained the process for mounting the actuating device 5 in the housing 1 of the toaster.

Generally speaking, the base 10 of the core 8 is assembled with the member on the housing 1, then the plate 20 carrying the winding 6, connected to the conductive tracks, is brought adjacent the core 8 so as to permit threading the hollow support 7 over said core, then fixing said plate in the housing.

In the example shown in FIGS. 1 and 2 in which the housing 1 is a plastic material and the toasting chamber is arranged vertically, the first operation of assembly of the base 10 in the slides 25 by sliding movement up to a so-called blocked position located adjacent the guides 21 for securement of the plate 20, is followed by a second operation of vertical sliding downwardly of the plate 20 in the vertical guides 21 thereby correctly to thread the winding 6 over the branch 11 of the core 8, corresponding to the bringing into abutment of the plate on the portion of the housing carrying the guides 21.

Thus, not only has there been provided an actuating device 5 giving rise to no deterioration of the plate 20, but also an extremely simplified method of manufacture has been provided, which is reliable, even permitting automatic production at low cost.

We claim:

1. Electric toaster comprising a housing enclosing a toasting chamber provided with at least one heating resistance and in which is movably mounted a bread carrier between at least one ejection position and a toasting position in which the bread carrier is retained by an electromagnetic actuating device comprising a control winding with a hollow support which is secured to a plate mounted fixedly in the housing and carrying at least electrical connection elements, said hollow support surrounding a magnetic core, and a movable armature adapted to retain the bread carrier in its toasting position when the winding is supplied, and wherein the magnetic core is mounted mechanically independently of the support of the winding and of the plate, and is secured to a member on the housing.

2. The electric toaster according to claim 1, wherein the hollow support of the winding surrounds the magnetic core with slight play.

3. The electric toaster according to claim 1, wherein the magnetic core comprises a base having means for assembly with the member on the housing.

4. The electric toaster according to claim 3, wherein the plate is fixedly mounted in guides secured to the housing.

5. The electric toaster according to claim 3, wherein the magnetic core is of general U shape whose base carries two branches having respective free ends located in the same plane; one of said branches carrying the winding and projecting from the winding at its free end.

6. The electric toaster according to claim 5, wherein the movable armature comprises a magnetic member of generally parallelepipedal shape and is suspended from a ring secured to the bread carrier.

7. The electric toaster according to claim 6, wherein the magnetic member has in its central region two opposed depressions provided respectively in two large lateral faces, and the ring comprises on its internal surface two opposed regions, a first of said opposed region coming into contact with a first of said depressions and serving as a pivot for the movable armature, while the other opposed region coming into opposition with the other depression and serving to center said movable armature, whereby a lower lateral face is adapted to come into flat contact with the free ends of the magnetic core.

8. The electric toaster according to claim 3, wherein the assembly means comprise two slides facing each other on the member, and on the base two opposed tongues having respectively a shape complementary to that of the slides and engaged in said slides.

9. The electric toaster according to claim 8, wherein the housing is made of a plastic material, and the member and the slides are made of one piece with said housing.

10. The electric toaster according to claim 1, wherein the winding has a longitudinal axis parallel to the plane of the plate, said plate being mounted in a plane parallel at least to the magnetic core traversing the hollow support of the winding.

11. Process for mounting an electromagnetic actuating device in a housing of a toaster, said housing enclosing a toasting chamber provided with at least one heating resistance and in which is movably mounted a bread carrier between at least one ejection position and a toasting position in which the bread carrier is retained by an electromagnetic actuating device comprising a control winding with a hollow support which is secured to a plate mounted fixedly in the housing and carrying at least electrical connection elements, said hollow support surrounding a magnetic core, and a movable armature adapted to retain the bread carrier in its toasting position when the winding is supplied; said magnetic core being mounted mechanically independently of the support, and being secured to a member on the housing; the process comprising:

assembling a base of the magnetic core with the member on the housing;

then bringing the plate carrying the winding adjacent the magnetic core so as to permit threading of the hollow support on said magnetic core;

then fixing said plate in the housing.

12. The process according to claim 11, wherein the base is assembled in slides by sliding movement up to a blocking position located adjacent guides for securement of the plate, then the plate is slid in the guides to thread correctly the winding over the magnetic core.

\* \* \* \* \*